United States Patent
Lehner et al.

(10) Patent No.: US 9,428,083 B2
(45) Date of Patent: Aug. 30, 2016

(54) VEHICLE SEAT WITH ROLLER GUIDE

(71) Applicant: GRAMMER AG, Amberg (DE)

(72) Inventors: Norbert Lehner, Freihung (DE); Dirk Kaessner, Kuemmersbruck (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/685,883

(22) Filed: Apr. 14, 2015

(65) Prior Publication Data

US 2015/0314706 A1 Nov. 5, 2015

(30) Foreign Application Priority Data

Apr. 16, 2014 (DE) .................. 10 2014 005 551

(51) Int. Cl.
 B60N 2/04 (2006.01)
 B60N 2/07 (2006.01)
 B60N 2/50 (2006.01)
 F16C 29/04 (2006.01)

(52) U.S. Cl.
 CPC ............. B60N 2/0722 (2013.01); B60N 2/502 (2013.01); B60N 2/508 (2013.01); B60N 2205/20 (2013.01); F16C 29/045 (2013.01); F16C 2202/08 (2013.01)

(58) Field of Classification Search
 CPC .... B60N 2/0722; B60N 2/502; B60N 2/508; B60N 2205/20; F16C 2202/08; F16C 29/045
 See application file for complete search history.

(56) References Cited

U.S. PATENT DOCUMENTS

| | | |
|---|---|---|
| 2,737,229 A | 3/1956 | Semar |
| 3,347,603 A | 10/1967 | Ignatjev |
| 3,479,099 A | 11/1969 | Krause |
| 3,891,269 A | 6/1975 | Moeser |
| 4,109,973 A | 8/1978 | Terada |
| 4,863,289 A | 9/1989 | Lecerf |
| 4,925,164 A | 5/1990 | Kopich |
| 4,941,637 A | 7/1990 | Pipon |

(Continued)

FOREIGN PATENT DOCUMENTS

| | | |
|---|---|---|
| DE | 1082138 | 5/1960 |
| DE | 2429019 | 1/1976 |

(Continued)

OTHER PUBLICATIONS

Examination Report prepared by the German Patent Office on Dec. 23, 2014, for German Application No. 10 2014 005 551.5.

(Continued)

*Primary Examiner* — Philip Gabler
(74) *Attorney, Agent, or Firm* — Sheridan Ross PC

(57) ABSTRACT

The invention relates to a vehicle seat with a roller guide. The roller guide includes at least one guide rail, and at least one roller received in the guide rail. A roller cover part of the roller is rollable with a running surface of the roller. The roller cover part is divided into a first circumferential surface-like functional region and a second circumferential surface-like functional region which are arranged one behind the other in a direction of a shaft of the roller. The first region is deformable by pressurization by seat occupation. The first region is in contact with an inner wall on a lower side of the roller and with an inner wall on the upper side of the roller. An outer diameter of the second region has an undersize with respect to a spacing between the inner wall on the upper and lower sides of the roller.

12 Claims, 3 Drawing Sheets

(56) References Cited

U.S. PATENT DOCUMENTS

| | | | |
|---|---|---|---|
| 5,046,698 A | 9/1991 | Venier | |
| 5,222,814 A | 6/1993 | Boelryk | |
| 5,323,998 A | 6/1994 | Aihara | |
| 5,344,114 A | 9/1994 | Rees | |
| 5,499,788 A | 3/1996 | Rees | |
| 5,582,381 A | 12/1996 | Graf et al. | |
| 5,737,971 A | 4/1998 | Riefe et al. | |
| 6,264,159 B1 | 7/2001 | Su | |
| 7,594,755 B2 | 9/2009 | Ropp | |
| 8,251,336 B2 | 8/2012 | Kimura et al. | |
| 9,027,899 B2 | 5/2015 | Haller et al. | |
| 9,079,512 B2 * | 7/2015 | Lehner | B60N 2/508 |
| 2001/0013570 A1 | 8/2001 | Yoshida et al. | |
| 2003/0230696 A1 | 12/2003 | Yamada et al. | |
| 2004/0126039 A1 | 7/2004 | Kashiyama et al. | |
| 2008/0164233 A1 | 7/2008 | Schroeder et al. | |
| 2008/0193062 A1 | 8/2008 | Ropp | |
| 2010/0243852 A1 | 9/2010 | Muraishi | |
| 2012/0074289 A1 | 3/2012 | Kimura et al. | |
| 2014/0167484 A1 | 6/2014 | Lehner | |

FOREIGN PATENT DOCUMENTS

| | | |
|---|---|---|
| DE | 2715640 | 10/1978 |
| DE | 2940424 | 4/1980 |
| DE | 3030725 | 3/1982 |
| DE | 196 48 170 C1 | 7/1997 |
| DE | 10 2004 038 507 C1 | 2/2006 |
| DE | 10 2006 059 088 A1 | 6/2008 |
| EP | 0685358 | 12/1995 |
| FR | 1281729 | 1/1962 |
| FR | 2567463 | 1/1986 |

OTHER PUBLICATIONS

Official Action (with English Translation) for China Patent Application No. 201310010285.2, dated Dec. 29, 2014, 9 pages.
Search Report for European Patent Application No. 13150954.9, dated May 8, 2013, 3 pages.
Official Action for German Application No. 102012100287.8, dated Aug. 23, 2012, 3 pages.
Official Action for German Patent Application No. 102012100287.8 dated Jul. 17, 2014, 5 pages.
Official Action for German Patent Application No. 102012112430.2 dated Aug. 9, 2013, 3 pages.
Official Action for U.S. Appl. No. 13/738,643, mailed Jun. 20, 2014, 10 pages.
Notice of Allowance for U.S. Appl. No. 13/738,643, mailed Feb. 3, 2015, 7 pages.
Official Action for U.S. Appl. No. 14/109,046, dated Feb. 20, 2015, 10 pages.
Notice of Allowance for U.S. Appl. No. 14/109,046, dated May 29, 2015, 5 pages.

* cited by examiner

VEHICLE SEAT WITH ROLLER GUIDE

CROSS-REFERENCE TO RELATED APPLICATIONS

This application claims the benefit of German Application No. 10 2014 005 551.5 filed Apr. 16, 2014, the contents of which are incorporated herein by reference.

DESCRIPTION

The invention relates to a vehicle seat with a roller guide, the roller guide having at least one guide rail, which is open at the side at least in part, and at least one roller, which rolls in the guide rail and is connected by at least one shaft to parts of the vehicle seat, according to the preamble of claim 1.

Roller guides for vehicle seats, in particular for rolling rollers which are connected to a scissor-action frame extending forwards and backwards in the forward and backward directions when the vehicle seat swings up and down, and therefore require rolling of the rollers inside the guide rail are generally known. Roller guides of this kind often exhibit the problem that inside the guide rails, which are usually U-shaped or C-shaped in cross section, the rollers have a relatively large amount of play upwards and downwards since said rollers would block themselves with respect to the abutting inner walls of the guide rail due to the opposing movements at the upper side and the lower side of said rollers.

In order to avoid such play of the rollers inside the guide rails, at least two rollers per roller bearing have, for example, previously been arranged inside the guide rail, specifically one roller which rolls on an inner wall, on the upper side of the roller, of the guide rail but does not make contact with the inner wall, on the lower side of the roller, of the guide rail and a further roller, which makes contact with the inner wall on the lower side of the roller but does not make contact with the inner wall on the upper side of the roller. This means that a combination of two rollers of this kind can achieve play-free rolling of the roller bearing and the parts secured thereto, such as the end of a scissor arm, inside the guide rail. However, roller bearings of this kind with the help of at least two rollers, optionally having shafts fixed in the height direction, are complex to produce and are expensive.

Rollers which can be configured as one- or two-component rollers are also known. Said rollers are produced, for example, from the plastics material POM (polyoxymethylene) and have good rolling behaviour, good wear properties, high tensile strength and only minimal manufacturing problems with regard to sink marks or bubbles. One problem, however, is that, on account of the crowned contour of the mass-produced rollers, only very small tolerances are permissible so as to avoid movements in the seat inclination and resultant irritating rattling noises, and to permit smooth and quiet rolling.

The object of the invention is to provide a vehicle seat with a roller guide, which can be produced in a cost-effective and simple manner, and which provides the configuration having just one roller.

This object is achieved according to the features of claim 1.

A fundamental issue of the invention lies in that, in the case of a vehicle seat with a roller guide, the roller guide having at least one guide rail which is open at the side at least in part, and at least one roller, which rolls in the guide rail and is connected by at least one shaft to parts of the vehicle seat, a roller cover part of the roller being rollable with at least part of a running surface of the roller along an inner wall, on the lower side of the roller, of the guide rail, said inner wall being arranged in parallel with or at an angle to the longitudinal course of the shaft, the roller cover part of the roller is divided at least into a first circumferential surface-like functional region and a second circumferential surface-like functional region which are arranged one behind the other in the direction of the shaft of the roller, and the first circumferential surface-like functional region of the roller cover part of the roller being deformable by pressurisation by means of seat occupation, and being in contact, in a movement-free state without seat occupation, with the inner wall on the lower side of the roller and with an inner wall, on the upper side of the roller, of the guide rail which extends in parallel therewith, and the outer diameter of the second circumferential surface-like functional region having an undersize with respect to a spacing between the inner wall on the upper side of the roller and on the lower side of the roller.

Due to the construction of a roller cover part, which in a correspondingly thin design may also be called the circumferential surface and which consists of two functional regions, the first of which, for example, can be deformed in the radial direction, it is advantageously achieved that, with the correct choice of shape of the corresponding first functional region, the roller is sufficiently compressed, and therefore deformed, at its lower side to no longer make contact at its upper side with the upper side inner wall of the guide rail, and therefore blocking-free rolling of the roller inside the U-shaped or C-shaped guide rail is possible. This described first situation illustrates the function of "free homogeneous rolling movement".

However, as soon as a person leaves the seat and the seat is therefore no longer occupied, there is then also insufficient pressurisation for the roller in order for it to be sufficiently deformed at its lower side in contact with the inner wall, on the lower side of the roller, of the guide rail. The deformation of the roller therefore recedes, as a result of which contact is established between the upper side of the roller and the inner wall, on the upper side of the roller, of the guide rail, and the movement of the roller inside the guide rail is slowed and the roller is in play-free contact inside the guide rail. Play-free contact of the roller is therefore in particular characterised in that said roller presses with its lower side against the lower inner wall and, at the same time, with its upper side against the upper inner wall of the guide rail, with the result that the roller is braced inside the guide rail. Movement of the roller inside the guide rail is therefore not possible in this state. This kind of slowing of the roller inside the U-shaped guide rail means that, when the person using the seat leaves the seat, an upward movement of the seat is prevented, and therefore it is not possible for the person to be wedged between the steering wheel and the front edge of the seat part. This described second situation illustrates the function of "play-free rest position".

A distinction can therefore be made between a first unstressed state of the roller, in which said roller is not yet arranged in a rolling manner in the guide rail and is therefore not yet installed, and between a second braced state or first deformation state of the roller, in which the roller is arranged in a rolling manner in the guide rail and in which at least the outer diameter of the first functional region is compressed to some extent at the points in contact with the guide rail so as to allow bracing in the guide rail and the necessary slowing or the lack of play of the roller inside the guide rail, the seat not yet being occupied in the second state, and between a third deformed state or second deformation state of the roller, in which the seat is occupied and the portion of the first functional region which is in contact with the inner wall, on the lower side of the roller, of the guide rail is deformed so that, as described, there is no longer any contact between the roller and the inner wall, on the upper side of the roller, of the guide rail.

Therefore, advantageously, in the first unstressed state of the roller, the outer diameter of the first circumferential surface-like functional region is oversized, at least in sections, with respect to the spacing between the inner wall on the upper side of the roller and the inner wall, on the lower side of the roller, of the guide rail extending in parallel therewith.

It is further conceivable for a first, second or more additional regions to be arranged in front of or behind the first and the second functional region in the axial direction of the roller. Said additional regions may be arranged between the first and the second functional region in the axial direction of the roller. However, the roller may also be configured such that, in the axial direction of the roller, the first functional region is followed by one or more additional regions and then by the second functional region and then, optionally, by further additional regions. It is also conceivable for one or more additional regions to be arranged first in the axial direction of the roller first, and the first functional region to then follow. Finally, either one or more additional regions may be arranged in the axial direction of the roller, or the second functional region may follow, which may in turn be followed by further additional regions.

Said additional regions can fulfil various functions. Firstly, they may serve as a transition region between the first and the second functional region. It is conceivable, for example, for an additional region to be arranged between the first and the second functional region, which additional region promotes the deformability of the first functional region by means of its material composition or its shape. Thus, for example, an additional region may comprise an annular groove or may be configured as an annular groove which is arranged on the outer surface of the roller and in a manner extending around the roller completely or in part. The roller material removed by the annular groove creates more space for the first functional region, such that said region can deform more easily. The cross section of said annular groove may be of different shapes, for example rectangular or semi-circular, or of a shape which is a combination of a rectangle arranged on the outer surface of the roller and a semicircle following in the radial direction of the roller. Furthermore, the edges of said annular groove may be rounded.

It is also conceivable for the additional regions to be arranged not only on the circumferential surface but, viewed in the radial direction of the roller, in a manner extending over the entire or almost entire roller. Thus, for example, one or more additional regions may be arranged between the first and the second functional region, which additional region(s) is/are formed as a continuous disc. Said discs may consist, for example, of a metal, in particular an aluminium alloy or steel. The discs have an outer diameter, for example, which is equal to or smaller than the outer diameter of the second functional region. The first and the second functional region may be connected to said disc(s) by means of a plug connection for example. Alternatively, the functional regions may be sprayed onto the discs. An arrangement of this kind means that the different first and second functional regions can be combined with one another in a simple manner, also retrospectively.

In order to promote the deformability of the first functional region it is furthermore possible to produce an additional region consisting of a different material from the rest or parts of the roller. Thus, the annular groove from the previous embodiment could be filled with this material in order to reduce the notch effect which occurs when creating an annular groove. This material may be a compressible material, such as PUR (polyurethane).

In order to allow the rolling movement and rest position described above, it is necessary to design the different functional regions in different shapes. Thus, the roller is divided, in terms of its roller contour, into two controllable functional regions for example. Said roller contour is, for example, a combination of a rigid cylinder as the second functional region, which is therefore present in a rigid or stiff configuration, and a yielding funnel as the first functional region, which has the function of automatic adjustment and resilient yielding. This adjustment or the resilient yielding respectively may occur by means of targeted deformation in the region of the first funnel-shaped functional region. The basis of this deformation is, for example, the material properties or the shape of the first functional region.

A cylinder shape or, with regard to the circumferential surface configuration, a hollow cylinder shape, can be assumed for the second functional region.

A preferred embodiment therefore provides for the first circumferential surface-like functional region to be formed substantially in a funnel shape and for the second circumferential surface-like functional region to be in the shape of a cylinder, preferably a hollow cylinder.

The second functional region may also be designed as a cone. This means that the outer diameter of the second functional region is designed so as to increase evenly in the axial direction. Preferably, in this case, the largest outer diameter of the second functional region is arranged at the end which is arranged facing the first functional region when viewed in the axial direction of the roller.

In this case, the first funnel-shaped functional region may have various configurations. Thus, the funnel or funnel shape may be configured such that the outer and inner surface of the funnel, which at the same time form the circumferential surface thereof, extend in parallel with one another, and so the funnel has a uniform wall thickness. However, the funnel may also have a non-uniform wall thickness. When viewed in cross section, the edges which delimit the outer surface and/or the inner surface and which extend from one end of the funnel to the other end of the funnel when viewed in the axial direction of the roller, may extend straight or curved to the left or the right, such that a bell-shaped funnel is formed for example. It is also conceivable for one or more of said edges to be formed of one or more portions curving in the same manner or in different manners, and of one or more straight portions.

Therefore, in the rest position (i.e. when the seat is not occupied), the funnel or funnel-shaped first functional region is braced in the guide rail for example, and permits play-free pairing of the roller and the guide rail. When a vertical load is present, the funnel yields and permits a homogeneous rolling movement on the cylinder surface. The advantageous separation of the roller contour into a rigid cylinder shape (or second cylindrical functional region) and a yielding funnel shape (or first funnel-shaped functional region) thus permits a controlled implementation of the two functions of "play-free rest position" (first function) and "free (homogeneous) rolling movement" (second function). A roller of this kind which is divided into two functional regions, as described, and thus fulfils two functions, as described, can also be referred to as a duplex roller.

The roller is advantageously configured such that it is furthermore able to compensate for dimensional differences in the profile by means of automatic adjustment to the spatial limits in the profile. Depending on the design, in the state of the first function ("play-free rest position") the roller can be rotated only with difficulty. When the seat is loaded, the roller experiences a vertical load. This causes a targeted deformation of the roller, with the result that the roller rests firmly on the bottom of the profile and is no longer in contact with the profile in the upper region. In this state of the second function ("free homogeneous rolling movement"), it is now possible to rotate the roller. This has a number of advantages. Firstly, relatively high resistance to wear is achieved by the fact that just a small portion of the circumferential surface of the roller has any contact with the guide rail. This portion is limited, in the case of the first function ("play-free rest position") to two contact points: the first contact point is formed between the outer diameter of the first functional region and the inner wall, on the upper side of the roller, of the guide rail; the second contact point is formed between the outer diameter of the first functional region and the inner wall, on the lower side of the roller, of the guide rail. In the case of the second function ("free rolling movement"), compressing the roller means that the first contact is lost, so contact then only remains between the outer diameter of the first functional region and the inner wall, on the lower side of the roller, of the guide rail. This contact then increases in terms of the size of the associated contact region with respect to the contact region from the first function. Thus, due to the compression of the roller and the associated deformation of the first functional region, a funnel-shaped first functional region is then formed in contact with the guide rail not only at the outermost end of said region when viewed in the radial direction of the roller, but over the entire length thereof when viewed in the axial direction of the roller. In contrast with the second functional region, the principal role of the first functional region is therefore mostly that of ensuring the slowing and the lack of play of the roller inside the guide rail respectively, or the homogeneous rolling, the second functional region, rather than the first, having the main support function during rolling.

On account of the undersize of the second functional region, said region does not have any contact with the guide rail in the case of the first function. On the other hand, if the roller is compressed and the second function is implemented, the second functional region is likewise formed in contact, over the entire length thereof, with the guide rail when viewed in the axial direction of the roller. Said second functional region thus provides a support function and forms the main running surface for the roller during rolling and assumes, as described above, the main support function during rolling of the roller.

A further advantage of the fact, described above, that just a small portion of the circumferential surface of the roller has any contact with the guide rail is that the outer surface of the roller is immune to tolerances since, for example, due to the described undersize of the second functional region and the small contact portion of the first functional region, a deviation in the desired dimension of the outer contour in most cases does not lead to the above-described problems such as rattling noises and prevention of smooth and quiet rolling. For the same reasons, there is also reduced sensitivity to sink marks or bubble formation, which may occur when manufacturing the roller. It merely has to be ensured that, as described above, there continues to be an appropriate undersize between the outer diameter of the second circumferential surface-like functional region and the spacing between the inner wall on the upper side of the roller and the inner wall, on the lower side of the roller, of the guide rail extending in parallel therewith. In addition, there must be an appropriate oversize between the outer diameter of the first circumferential surface-like functional region and the spacing between the inner wall on the upper side of the roller and the inner wall, on the lower side of the roller, of the guide rail extending in parallel therewith, the oversize applying to the roller in the unstressed, i.e. non-installed, state.

Overall, the described advantageous embodiment of the roller contour thus provides a high degree of rolling reliability, i.e. reliable cooperation between the guide rail and the roller.

In practice, it has proven advantageous for the first circumferential surface-like functional region of the roller to be arranged facing the additional inner wall of the guide rail, said additional inner wall being arranged between the inner walls on the upper side and on the lower side of the roller. Thus, guide rails, of which the inner walls on the upper side and on the lower side of the roller respectively, or the associated leg of the profile respectively on the upper side and on the lower side of the roller respectively, have a small width, may also be used, since the contact between the roller and the guide rail occurs in a space-saving manner close to the region in which the inner wall on the upper side of the roller and the inner wall, on the lower side of the roller, of the guide rail respectively are connected to the additional inner wall of the guide rail. Furthermore, a component can thus be attached, in a simple manner, to the advantageously cylindrical second functional region as the shaft of the roller.

When the roller consists of a first and a second functional region, it has proven as being advantageous in the movement-free state without seat occupation for a ratio of the length of the first functional region and the length of the second functional region, measured in each case in the direction of the shaft of the roller, to be of a value ranging from 0.25 to 1.25, preferably 0.75.

By way of example, a roller may have, inter alia, the following dimensions:

The length of the first functional region in the unstressed state may, for example, be of a value ranging from 3 to 10 mm, preferably from 5 to 8 mm, most preferably 6.8 mm.

The length of the second functional region may, for example, be of a value ranging from 4 to 14 mm, preferably from 6 to 11 mm, most preferably 9 mm.

The outer diameter of the first functional region in the unstressed state may, for example, be of a value ranging from 20 to 35 mm, preferably from 22 to 28 mm, most preferably 26 mm.

The outer diameter of the second functional region may, for example, be of a value ranging from 18 to 34 mm, preferably from 22 to 30 mm, most preferably 26 mm.

The oversize of the outer diameter of the first functional region in the unstressed state with respect to the spacing between the inner wall on the upper side of the roller and the inner wall, on the lower side of the roller, of the guide rail extending in parallel therewith may, for example, be of a value ranging from 0 to 1.5 mm, preferably 0.9 mm.

The undersize of the outer diameter of the second functional region with respect to the spacing between the inner wall on the upper side of the roller and the inner wall, on the lower side of the roller, of the guide rail extending in parallel therewith may, for example, be of a value ranging from 0 to 2 mm, preferably 1.5 mm.

The dimensions and length ratios of the roller according to the invention mentioned in the description describe advantageous embodiments. Nonetheless, it is possible for dimensions and/or length ratios other than those described to also be used, such that the present invention is in particular not restricted to the mentioned values.

Therefore, it is possible in particular for the outer diameter of the roller in the first and/or second functional region to be smaller or larger than the described values, so that the configurations according to the invention may also be used on rollers ranging from small to large. The same applies to the ratio between the lengths of the first functional region and the second functional region. This ratio may also deviate upwards or downwards from the values described as being advantageous. Moreover, it is possible for the described undersizes and oversizes to also deviate upwards or downwards from the values described as being advantageous. Finally, it is also possible for the proportions of the roller to remain the same or to change. It is thus possible in particular for the other described values of the roller to change in a manner proportional or otherwise to the changed dimensions. This applies, for example, to the wall thickness of the first functional region, to the dimensions of the cylindrical cavity of the roller, i.e. in particular the length and diameter, and to the spacing between the inner surface of the cavity and the outer surface of the first functional region.

The first functional region undergoes the above-described deformation and so is responsible inter alia for the running behaviour of the roller and the interaction between the roller and the guide rail. The second functional region forms the mechanical stabilisation and connection respectively for the first functional region and is likewise responsible for ensuring smooth running behaviour of the roller which comes into effect in the deformed state of the roller. The above-described preferred length ratios thus ensure, on the one hand, that the funnel formed by the first functional region is large enough to undergo a deformation which results in there no longer being any oversize between the roller and the inner wall on the upper side of the roller and the inner wall, on the lower side of the roller, of the guide rail respectively, but rather that the roller can, as described above, experience a free homogeneous rolling movement inside the guide rail. On the other hand, it is ensured that the second functional region is also large enough to fulfil its role of mechanical stabilisation and of ensuring the smooth running of the roller.

A preferred embodiment provides for the roller to consist of a material which, in addition to favourable mechanical properties such as high strength and rigidity in the case of good toughness, high wear resistance and low coefficients of sliding friction, also has favourable temperature resistance, for example from −40° C. to approximately 100° C. Above all, the material must, of course, be capable, in terms of its resilient properties, of having the described spring properties. Said material has, therefore, to be elastically yielding or elastically deformable. This, of course, also applies above all to the first functional region, since said region, as described above, has to be configured so as to be deformable in a targeted manner and restorable again. In addition, the material has to have sufficient resistance to wear on account of the rolling movement.

It is therefore advantageous, for example, for the first functional region and/or the second functional region to consist of a resilient material.

An advantageous embodiment provides, for example, for the first functional region and/or the second functional region to consist of a plastics material, in particular polyoxymethylene (POM).

It is also conceivable for only the first functional region to consist of a resilient material such as a plastics material, for example POM. The second functional region may consist of a metal for example. It is conceivable for the first functional region to be arranged around the rest of the roller by means of an injection moulding process during production.

A preferred embodiment provides for the first functional region to be arranged so as to surround a substantially cylindrical portion of the roller which is on the inside in the radial direction of the roller, a cavity substantially in the shape of a hollow cylinder being arranged between the first functional region and the cylindrical portion in the radial direction of the roller.

Said cylindrical portion may be provided with a chamfer or a rounding arranged on the edge between the end face arranged between the inner walls on the upper and lower sides of the roller in the direction of the inner wall of the guide rail, and the circumferential surface of the cylindrical portion. When a rounding is provided, said rounding may be arranged facing inwards or outwards, such that the cross section of the cylindrical portion at the edge having the rounding has a curvature either to the left or to the right. Further possible embodiments are described in the figures.

In addition, the cross section of the cavity, which is substantially in the shape of a hollow cylinder, may, for example, have either a straight edge or a semi-circular edge on the side thereof facing the second functional region.

The cavity in the shape of a hollow cylinder firstly permits the formation of a funnel shape of the first functional region, and secondly the deformation thereof viewed towards the inside in the radial direction.

Additional elements such as drilled core holes may be arranged on said cylinder. In addition, it is advantageous if, in order to receive a component which is to form the running axle of the roller, the roller has, for example, a cylindrical cavity in the core region. Said cavity is advantageously formed starting from the end face of the second functional region which is arranged remote from the first functional region, when viewed in the axial direction of the roller. With regard to the length of said cavity, it is formed, for example, so as to extend into the first functional region. However, it is also conceivable for the length of the cylindrical cavity viewed in the axial direction of the roller to correspond to the length of the second functional region viewed in the axial direction of the roller. Said cylindrical cavity may be provided with a chamfer on the side constituting the end face of the second functional region.

The first functional region is therefore provided in order to be compressed in the event of seat occupation and the associated pressurisation. Said compression results in a reduction in the outer diameter of the first functional region, such that the first functional region is no longer in contact with the guide rail in the region of the upper side of the roller. The deformation may be different depending on the material properties and the shape.

In practice, it has proven as being advantageous in the event of pressurisation due to seat occupation for the outer diameter of the first functional region of the roller cover part to be reduced, in the region of contact with the inner wall on the lower side of the roller, by 0.5 to 2.5 mm, preferably by 1.8 mm. This reduction in thickness is enough to release the roller at its upper side and therefore remove the slowing and lack of play of the roller respectively inside the guide rail.

When the roller is arranged in a play-free manner inside the guide rail, a blocking of the roller inside the guide rail may in particular also be referred to.

The first functional region of the roller is in addition provided so as to expand again into the braced state when the load is removed from the seat, i.e. when the seat is not occupied and there is no pressurisation, such that automatic compensation for play occurs between the roller and the guide rail.

It is therefore advantageous in the movement-free state without seat occupation for the roller to press strongly, with an expanded first functional region of the roller cover part, against the inner wall on the lower side of the roller and the inner wall, on the upper side of the roller, of the guide rail, in such a way that the roller is blocked inside the guide rail. The suitable material for the roller cover part must be chosen for this in order, depending on the weight of the persons who might occupy the seat, to achieve sufficient compression of the roller cover part in the lower region with respect to the inner wall, so that blocking is removed. The shape is also crucial to this behaviour.

On the other hand, sufficient extension of the roller cover part should also occur, however, when the seat is not occupied in order to block the roller inside the guide rail, although it should also be possible for this blocking or lack of play to be cancelled again when the seat is occupied by a lightweight person.

Configuring a roller, for example, having a first and a second functional region therefore makes it possible to use just one roller per roller bearing. This results in a manufacturing process that requires fewer materials, and therefore saves costs as well.

Advantageous embodiments emerge from the dependent claims.

Advantages and expediencies can be found in the following description in conjunction with the drawings, in which.

Figure 1:
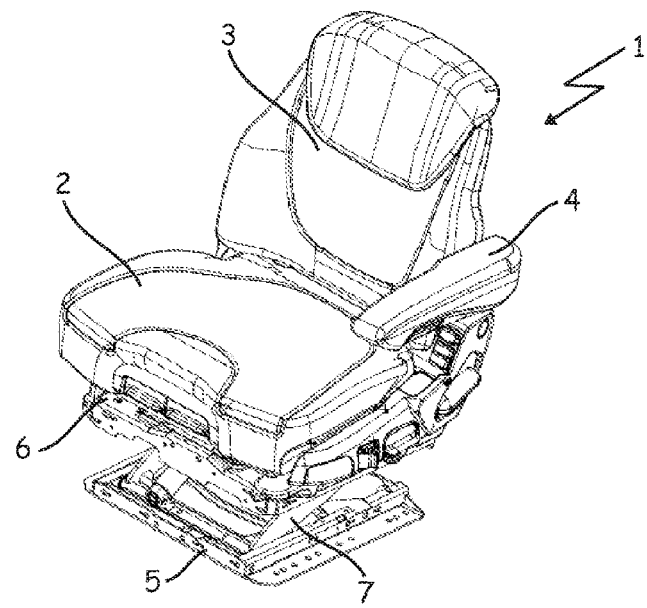
FIG. 1 is a schematic perspective view of a vehicle seat.
Figures 6A, 6B:
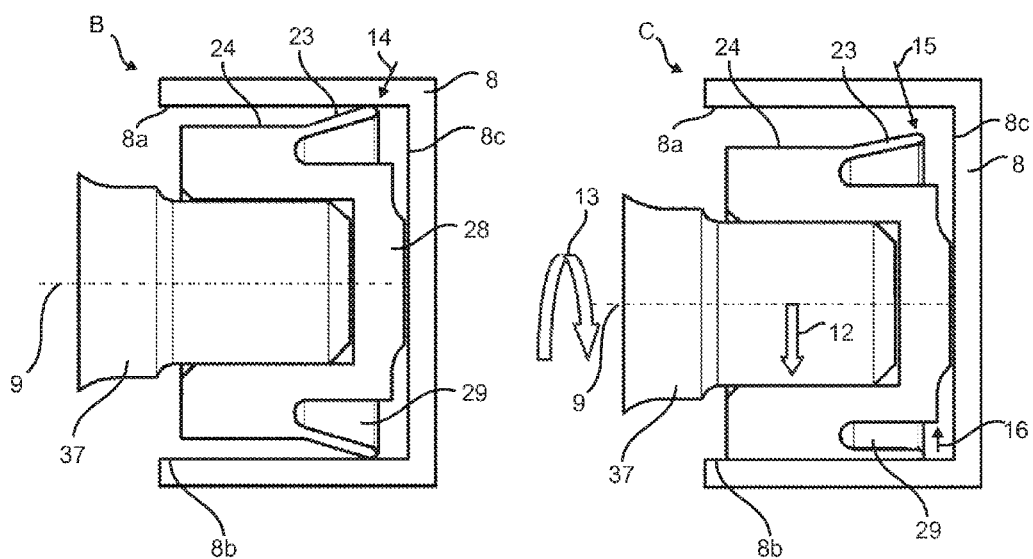

FIG. 6a, b are cross sections of the roller guide for the vehicle seat according to the invention with a roller in a play-free state (braced state) and in a free-rolling state (deformed state);

FIG. 1 is a perspective view of a vehicle seat 1 comprising a seat part 2 and a backrest 3. This vehicle seat likewise has an armrest 4.

A lower part 5 is connected opposite an upper part 6 by means of scissor arms 7, it being possible for said two parts 5, 6 to move towards each other in the form that the upper part 6 is mounted so as to swing with respect to the lower part.

Figure 2:
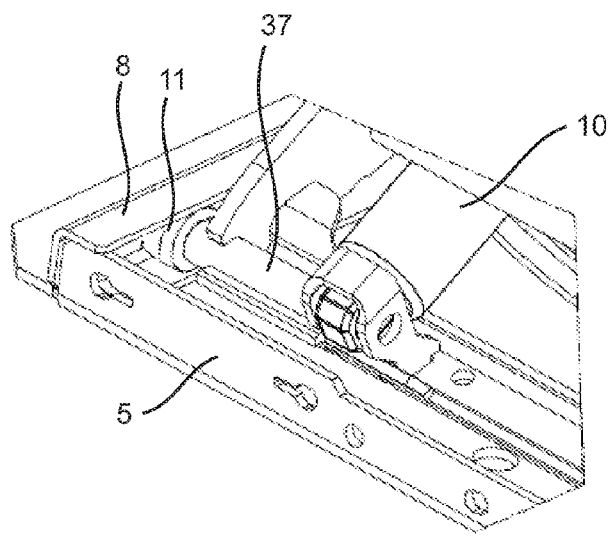
FIG. 2 is a perspective detail of a portion of the vehicle seat according to the present invention with parts of the roller guide.

To allow the scissor arms to swing up and down, said arms must be movably arranged at least in part, and even at their lower ends, in the longitudinal direction of the vehicle, i.e. in the forward and backward directions. As shown in FIG. 2, guide rails 8 are present for this purpose, which guide rails preferably have a C-shaped or U-shaped cross section and inside which rollers 11, in this case one roller 11, can be mounted so as to roll.

The roller 11 is arranged on a shaft 37, to which parts of the vehicle seat are in turn secured, such as a damper 10, which is designed to have a damping effect on the upwards and downwards movement of the vehicle seat, i.e. of the upper part 6 with respect to the lower part 5.

Figure 3:
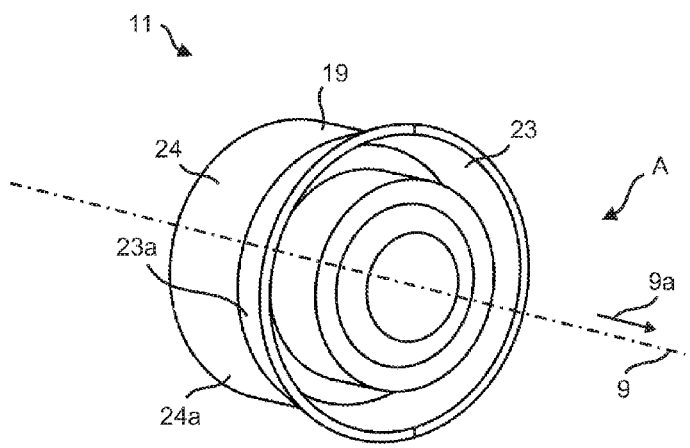
FIG. 3 is a perspective view of an embodiment of the roller according to the invention in an unstressed state.

FIG. 3 is a perspective view of an embodiment of the roller 11 according to the invention comprising a running surface 19 in an unstressed, i.e. non-installed, state A. Said roller 11 has a roller cover part or even a roller contour, which is divided into a first circumferential surface-like functional region 23 having an outer surface 23a and a second circumferential surface-like functional region 24 having an outer surface 24a. The two functional regions are arranged one behind the other in the direction 9a of the shaft 9 of the roller 11. As can be seen here, the first functional region 23 is formed substantially in the shape of a funnel and the second circumferential surface-like functional region 24 is cylindrical.

Figure 4:
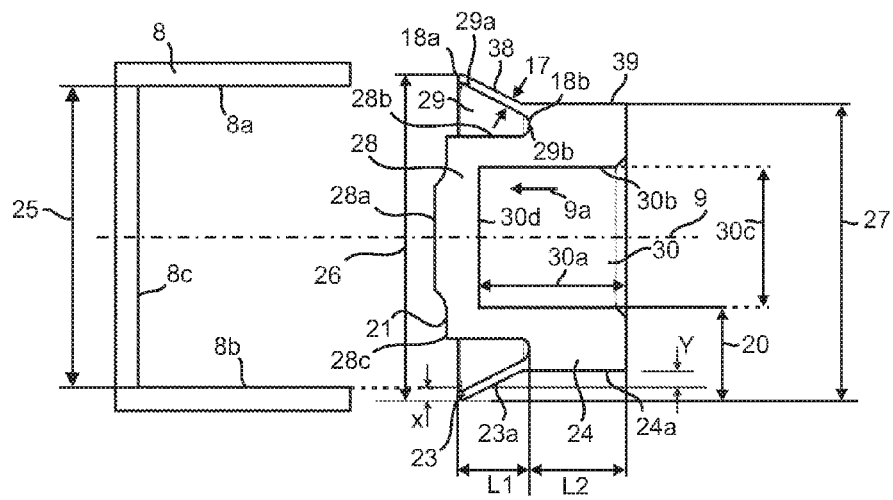
FIG. 4 is a cross section of a guide rail and an embodiment of the roller according to the invention.

FIG. 4 is a cross section of a guide rail 8 and an embodiment of the roller 11 according to the invention, the roller 11 being shown here in the unstressed state (A). The guide rail 8 is C-shaped in this embodiment. The roller is configured, for example, according to the roller of FIG. 3. The aperture dimension of the guide rail is the spacing 25 between the inner wall 8a on the upper side of the roller and the inner wall 8b, on the lower side of the roller, of the guide rail 8 extending in parallel therewith. A comparison of the cross-sectional view of the roller 11 with the cross-sectional view of the guide rail 8 makes it clear that the outer diameter 38 of the first circumferential surface-like functional region 23 has an oversize x, at least in portions, with respect to the spacing 25 and the outer diameter 39 of the second circumferential surface-like functional region 24 has an undersize y with respect to the spacing 25.

The first functional region 23 is arranged in this embodiment in such a way as to surround a substantially cylindrical portion 28 of the roller 11 which is on the inside in the radial direction 11a of the roller 11. At the same time, it can be seen that a cavity 29 is arranged between the first functional region 23 and the cylindrical portion 28 in the radial direction 11a of the roller 11. Said cavity is formed substantially in the shape of a hollow cylinder.

The first end 18a of the first functional region 23 faces the end face 28a of the cylindrical portion 28 in the axial direction 9a of the roller 11. The second end 18b forms the termination of the first functional region 23 on the side facing away from the end face 28a of the cylindrical portion 28 in the axial direction of the roller 11. Irrespective of whether the first functional region 23 is configured as a funnel or in another shape, the spacing parallel with the shaft 9 of the roller 11 between the first end 18a and the second end 18b is preferably smaller than that between the end face 28a and the second end 18b. This can be seen in this example.

In this case, the wall thickness 17 of the first functional region 23 corresponds to the spacing between the periphery 29a of the cavity 29 and the outer surface 23a of the first functional region 23. In this preferred embodiment, the wall thickness 17 is uniform from the first end 18a to the second end 18b. Advantageously, the wall thickness 17 is of a value ranging from 1 to 3 mm, preferably 2 mm.

In this case, the outer surface 24a of the second functional region 24 has an outer diameter 39 which is preferably uniform. In this case, the outer surface 23a of the first functional region 23 has an outer diameter 38 which is an outward funnel shape, and therefore not uniform. The change in the outer diameter is substantially constant in the axial direction of the roller in this case.

The cylindrical portion 28 is provided with a rounding which is arranged to completely surround the transition 28c between the end face 28a and the circumferential surface 28b of the cylindrical portion 28 when viewed in the radial direction of the roller. In this case, the transition 28c forms the entire edge or surface between the end face 28a and the circumferential surface 28b. It is also conceivable for no transition 28c, apart from an edge, to be arranged between the end face 28a and the circumferential surface 28b, such that said end face and said circumferential surface are arranged so as to be substantially directly adjacent to each other. In this example, the rounding is arranged so as to be directed inwards, such that the cross section of the cylindrical portion 28 has a curvature to the left on the edge of the rounding above the shaft 9 of the roller 11. As part of the transition 28c, one or more straight portions may adjoin the rounding, which straight portions are arranged adjacently to the end face 28a and/or adjacently to the circumferential surface 28b. In this example there is one straight portion 21, which is arranged adjacently to the circumferential surface 28b.

In this embodiment, the cavity 29 is configured in such a way that a rounding is formed on the surface 29b thereof facing the second functional region 24. In this respect, the cross section of the cavity 29 has a semi-circular edge on each side of the shaft 9 of the roller 11 in this region.

In this example, the circumferential surface 28b extends concentrically around the longitudinal shaft 9 of the roller 11. In addition, in this example the circumferential surface 28b has a constant diameter.

The periphery 29b of the cavity 29 preferably at the same time forms the second end 18b of the first functional region 23 in the axial direction 9a of the roller 11.

In this case, the length of the arrow 26 corresponds to the spacing 25 plus twice the oversize x. In this case, the length of the arrow 27 corresponds to the spacing 25 minus twice the undersize y.

In order to receive a component which is to form the running axle 37 of the roller 11, the roller 11 has a cylindrical cavity 30 of diameter 30c in the core region. With regard to the length 30a thereof, when viewed in the axial direction 9a of the roller 11, said cavity 30 is formed starting from the end face of the second functional region 24 which is arranged so as to be remote from the first functional region 23, and extends into the first functional region 23. A spacing 20 is defined by the inner surface 30b of the cavity 30 and the outer surface 24a of the first functional region 24. Said spacing thus corresponds to half the difference between the diameter 39 of the outer surface 24a and the diameter of the inner surface 30b.

In this case, the diameter 30c is advantageously of a value ranging from 8 to 16 mm, preferably 12 mm.

In this case, the spacing 20 is advantageously of a value ranging from 5 to 9, preferably 7 mm.

In this case, the ratio of the diameter 30c to the outer diameter 39 of the second functional region 24 corresponds, for example, to a value ranging from 0.2 to 0.9, preferably 0.4 to 0.6, more preferably 0.46.

In addition, the roller 11 may comprise a further drilled hole (not shown here) which extends concentrically around the shaft 9 of the roller 11 and is arranged, for example, on the end face 28a and extends from said end face to the inner end face 30d of the cavity 30. This further drilled hole preferably has a constant diameter, which is also preferably smaller than the diameter 30c of the cavity 30.

Figure 5:
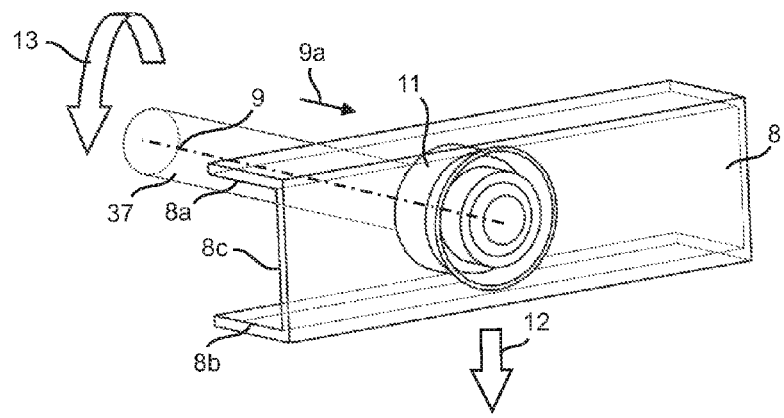
FIG. 5 is a perspective view of a detail of the roller guide of the vehicle seat according to the invention.

FIG. 5 is a perspective view of a U-shaped guide profile or the guide rail 8 respectively comprising an inner wall 8a on the upper side of the roller or the upper side respectively and an inner wall 8b on the lower side of the roller or the lower side respectively. It can be seen from this drawing that when the roller moves to the left viewed in the image plane, i.e. performs a rolling movement in accordance with the round arrow 13, the roller 11 rolls along the lower side inner wall 8b. The shaft 9 obviously moves together with the roller in this direction and has an axial direction 9a.

This kind of movement of the roller to the right is only possible, however, if pressurisation occurs in accordance with the arrow 12 due, for example, to the seat being occupied by a person. The roller 11 is pushed downwards hereby and undergoes a deformation of its lower side which is the contact side with the lower side inner wall 8b of the guide rail 8. The roller is therefore released at its upper side, i.e. with respect to the upper side inner wall 8a of the guide rail 8.

This becomes clear by more closely studying FIGS. 6a and 6b, which are cross sections of a roller 11 in the play-free or braced state B thereof respectively (FIG. 6a) and in the free-rolling or deformed state C thereof (FIG. 6b) respectively. It can clearly be seen in this drawing that as soon as it undergoes pressurisation 12, for example by means of seat occupation, the roller 11 undergoes a type of free-rolling or detachment from the upper side inner wall 8a in its upper region respectively. This is illustrated by the arrow 15. Arrow 16 shows that the roller 11 is compressed in the contact region thereof, against the inner wall 8b on the lower side of the roller, such that said roller is pushed upwards in this region. Here, both the first functional region 23 and the second functional region 24 are in contact over their entire lengths with the lower inner wall 8b of the guide rail 8 when viewed in the axial direction 9a of the roller 11.

By contrast, where there is no pressurisation the roller rests in a play-free manner on its upper side with respect to the upper side inner wall 8a of the guide rail 8. This is illustrated by the arrow 14. This results in blocking of the roller 11 inside the guide rail 8, i.e. the roller 11 is arranged in a play-free manner inside the guide rail 8 respectively, which is desired.

All of the features disclosed in the application documents are claimed as being essential to the invention if they are novel over the prior art individually or in combination.

LIST OF REFERENCE SIGNS 1 vehicle seat
2 seat part
3 backrest
4 armrest
5 lower part
6 upper part
7 scissor arms
8 guide rails
8a inner wall on the upper side (of the roller)
8b inner wall on the lower side (of the roller)
9 shaft
9a axial direction/longitudinal course
10 damper
11 roller
11a radial direction
12 arrow/pressurisation
13 round arrow
14 arrow
15 arrow 16 arrow
17 wall thickness
18a first end
18b second end
19 running surface
20 spacing
21 straight portion
22 roller cover part
23 first circumferential surface-like functional region
23a outer surface
24 second circumferential surface-like functional region
24a outer surface
25 spacing
26 spacing
27 spacing
28 portion of the roller
28a end face
28b circumferential surface
28c transition
29 cavity
29a periphery
29b periphery
29c periphery
30 cavity
30a length
30b inner surface
30c diameter
30d inner end face
37 shaft
38 outer diameter
39 outer diameter
L1 length
L2 length
x oversize
y undersize

What is claimed is:

1. A vehicle seat comprising a roller guide, the roller guide having at least one guide rail, which is open at a side at least in part, and at least one roller, which rolls in the guide rail and is connected by at least one shaft to parts of the vehicle seat, a roller cover part of the roller being rollable with at least part of a running surface of the roller along a first inner wall of the guide rail, said first inner wall being arranged on a lower side of the roller, and in parallel with or at an angle to a longitudinal course of the shaft,
wherein the roller cover part of the roller is divided at least into a first functional region and a second functional region which are arranged as circumferential surfaces one behind the other in a direction of the shaft of the roller, and the first functional region of the roller cover part of the roller being deformable by pressurization by means of seat occupation, and being in contact, in a movement-free state without seat occupation, with the first inner wall and with a second inner wall of the guide rail, said second inner wall being arranged on an upper side of the roller and extending in parallel with the first inner wall, and wherein the outer diameter of the second functional region is smaller than a spacing between the first inner wall and the second inner wall.

2. The vehicle seat according to claim 1, wherein the first functional region is formed substantially in a funnel shape and the second functional region is in a shape of a cylinder.

3. The vehicle seat according to claim 2, wherein the second functional region is in the shape of a hollow cylinder.

4. The vehicle seat according to claim 1, wherein the first functional region of the roller is arranged facing a third inner wall of the guide rail, said third inner wall being arranged between the second inner wall and the first inner wall.

5. The vehicle seat according to claim 1, wherein, in the movement-free state without seat occupation, a ratio of the length of the first functional region and the length of the second functional region, measured in each case in the direction of the shaft of the roller, is of a value ranging from 0.25 to 1.25.

6. The vehicle seat according to claim 5, wherein in the movement-free state without seat occupation, the ratio of the length of the first functional region and the length of the second functional region, measured in each case in the direction of the shaft of the roller, is 0.75.

7. The vehicle seat according to claim 1, wherein the first functional region consists of a resilient material.

8. The vehicle seat according to claim 1, wherein the first functional region is arranged so as to surround a substantially cylindrical portion of the roller which is on an inside in a radial direction of the roller, a cavity substantially in a shape of a hollow cylinder being arranged between the first functional region and the cylindrical portion in the radial direction of the roller.

9. The vehicle seat according to claim 1, wherein, in the event of pressurization due to seat occupation, the outer diameter of the first functional region of the roller cover part is reduced, in the region of contact with the first inner wall, by 0.5 to 2.5 mm.

10. The vehicle seat according to claim 9, wherein, in the event of pressurization due to seat occupation, the outer diameter of the first functional region of the roller cover part is reduced, in the region of contact with the first inner wall of the roller, by 1.8 mm.

11. The vehicle seat according to claim 1, wherein, in the movement-free state without seat occupation, the roller presses, with the expanded first functional region of the roller cover part, against the first inner wall and the second inner wall of the guide rail, in such a way that the roller is blocked inside the guide rail.

12. The vehicle seat according to claim 1, wherein the second functional region consists of a resilient material.

* * * * *